United States Patent
Choi

(10) Patent No.: US 10,851,670 B2
(45) Date of Patent: Dec. 1, 2020

(54) ROTARY SHAFT SUPPORT STRUCTURE AND TURBINE AND GAS TURBINE INCLUDING THE SAME

(71) Applicant: DOOSAN HEAVY INDUSTRIES & CONSTRUCTION CO., LTD., Changwon (KR)

(72) Inventor: Tae Gyu Choi, Yongin-si (KR)

(73) Assignee: Doosan Heavy Industries Construction Co., Ltd, Gyeongsangnam (KR)

( * ) Notice: Subject to any disclaimer, the term of this patent is extended or adjusted under 35 U.S.C. 154(b) by 201 days.

(21) Appl. No.: 16/027,368

(22) Filed: Jul. 5, 2018

(65) Prior Publication Data

US 2019/0078465 A1    Mar. 14, 2019

(30) Foreign Application Priority Data

Sep. 8, 2017    (KR) .................. 10-2017-0115165

(51) Int. Cl.
*F01D 25/16*    (2006.01)
*F02C 3/04*    (2006.01)
(Continued)

(52) U.S. Cl.
CPC ......... *F01D 25/162* (2013.01); *F01D 25/164* (2013.01); *F02C 3/04* (2013.01);
(Continued)

(58) Field of Classification Search
CPC ........ F01D 25/162; F01D 25/164; F02C 3/04; F02C 7/06; F16C 17/02; F16C 17/03;
(Continued)

(56) References Cited

U.S. PATENT DOCUMENTS

| | | | | |
|---|---|---|---|---|
| 3,351,394 A | * | 11/1967 | Hooker | ............... F16C 17/03 384/117 |
| 4,643,592 A | * | 2/1987 | Lewis | ............... F16C 17/03 384/100 |
| 7,431,504 B1 | * | 10/2008 | Pelfrey | ............... F01D 25/164 384/535 |

(Continued)

FOREIGN PATENT DOCUMENTS

| JP | 2009-257349 A | 11/2009 |
|---|---|---|
| KR | 10-2013-00040089 A | 4/2013 |
| KR | 10-2017-0083836 A | 7/2017 |

*Primary Examiner* — Aaron R Eastman

(74) *Attorney, Agent, or Firm* — Invenstone Patent, LLC

(57) ABSTRACT

A rotary shaft support structure supports each of both ends of a rotary shaft passing through a center of a gas turbine and includes a main body arranged around a circumference of the rotary shaft and mounted to each of a compressor casing and a turbine casing of the gas turbine; a pad member disposed between the main body and the circumferential surface of the rotary shaft and biased against the circumferential surface of the rotary shaft for supporting the rotary shaft; a pivot protrusion protruding from the pad member toward the main body; and a pivot housing for receiving the pivot protrusion to rotatably support the pad member. The mechanical bias is supplied by a spring member seated in the mounting groove to bias the pivot housing against the pivot protrusion. The rotary shaft support structure exhibits performance as a bearing by absorbing some of an applied load.

12 Claims, 5 Drawing Sheets

(51) Int. Cl.
 *F16C 17/02* (2006.01)
 *F16C 17/03* (2006.01)
 *F02C 7/06* (2006.01)
(52) U.S. Cl.
 CPC ............... *F02C 7/06* (2013.01); *F16C 17/02* (2013.01); *F16C 17/03* (2013.01); *F05D 2220/32* (2013.01); *F05D 2240/14* (2013.01); *F05D 2240/50* (2013.01); *F05D 2240/54* (2013.01); *F05D 2260/52* (2013.01); *F05D 2260/96* (2013.01); *F16C 2360/23* (2013.01)
(58) Field of Classification Search
 CPC ............. F16C 2360/23; F05D 2220/32; F05D 2240/14; F05D 2240/50; F05D 2240/54; F05D 2260/52; F05D 2260/96
 See application file for complete search history.

(56) References Cited

U.S. PATENT DOCUMENTS

| 2003/0063821 | A1* | 4/2003 | Dourlens | F16C 17/03 384/99 |
| 2003/0063822 | A1* | 4/2003 | Dourlens | F16C 17/03 384/99 |
| 2006/0018774 | A1* | 1/2006 | Casaro | F01D 25/164 417/423.12 |
| 2009/0304313 | A1* | 12/2009 | Ertas | F16C 17/035 384/99 |
| 2012/0181734 | A1* | 7/2012 | Zeidan | F16F 15/1215 267/140.11 |
| 2018/0320551 | A1* | 11/2018 | Iijima | F16C 17/02 |
| 2019/0195078 | A1* | 6/2019 | Blais | F16J 15/3416 |
| 2019/0277149 | A1* | 9/2019 | Ha | F16J 15/164 |

* cited by examiner

【FIG. 1】
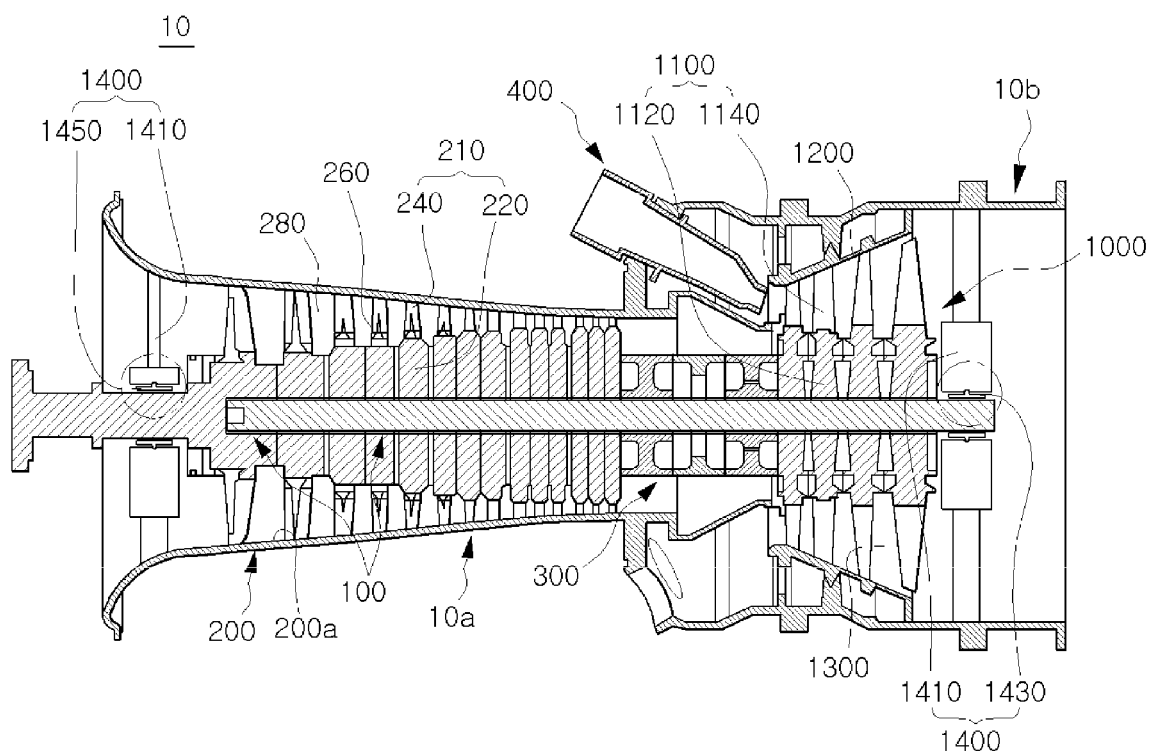

[FIG. 2]
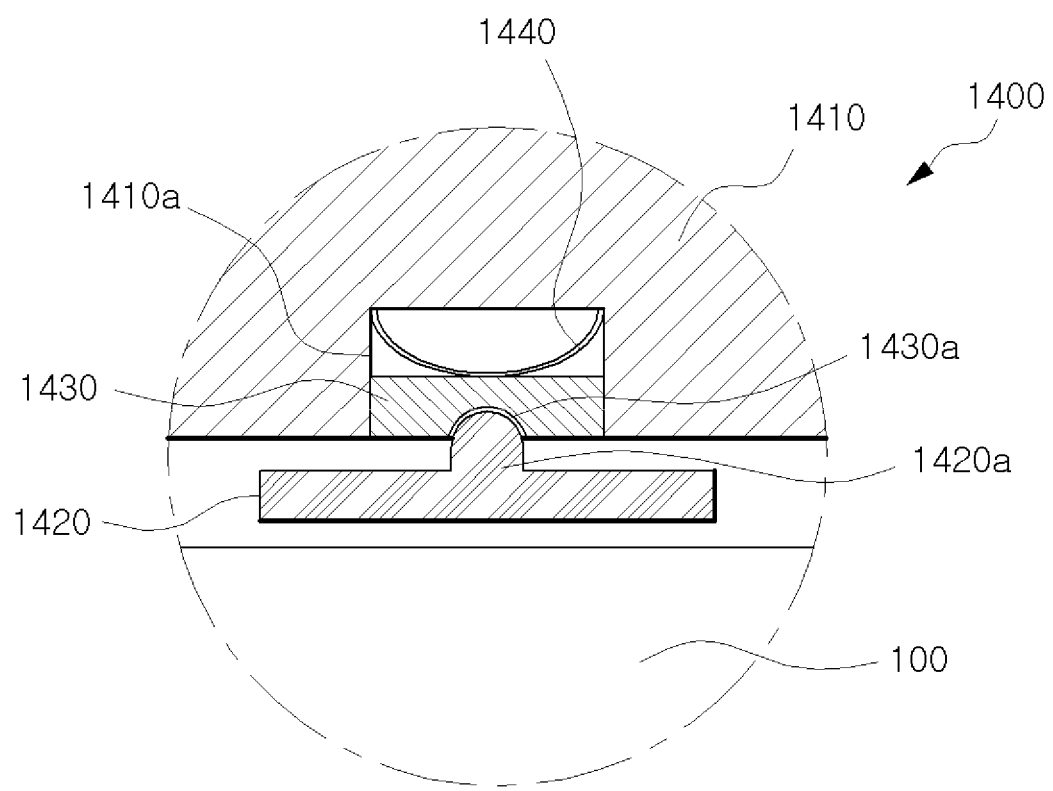

【FIG. 3】
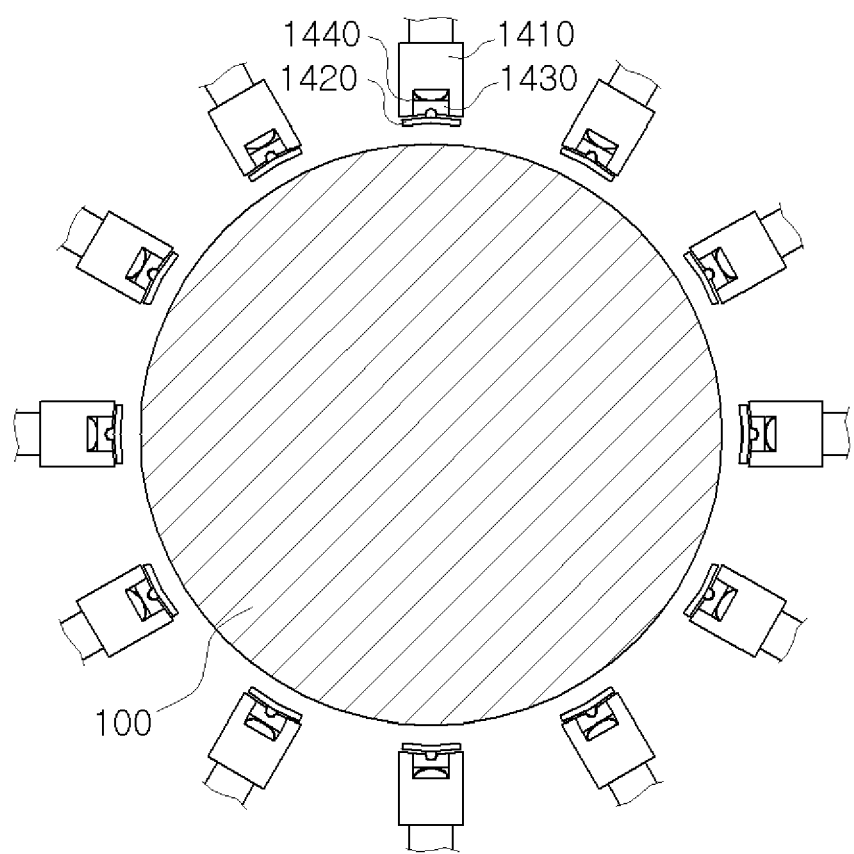

[FIG. 4]
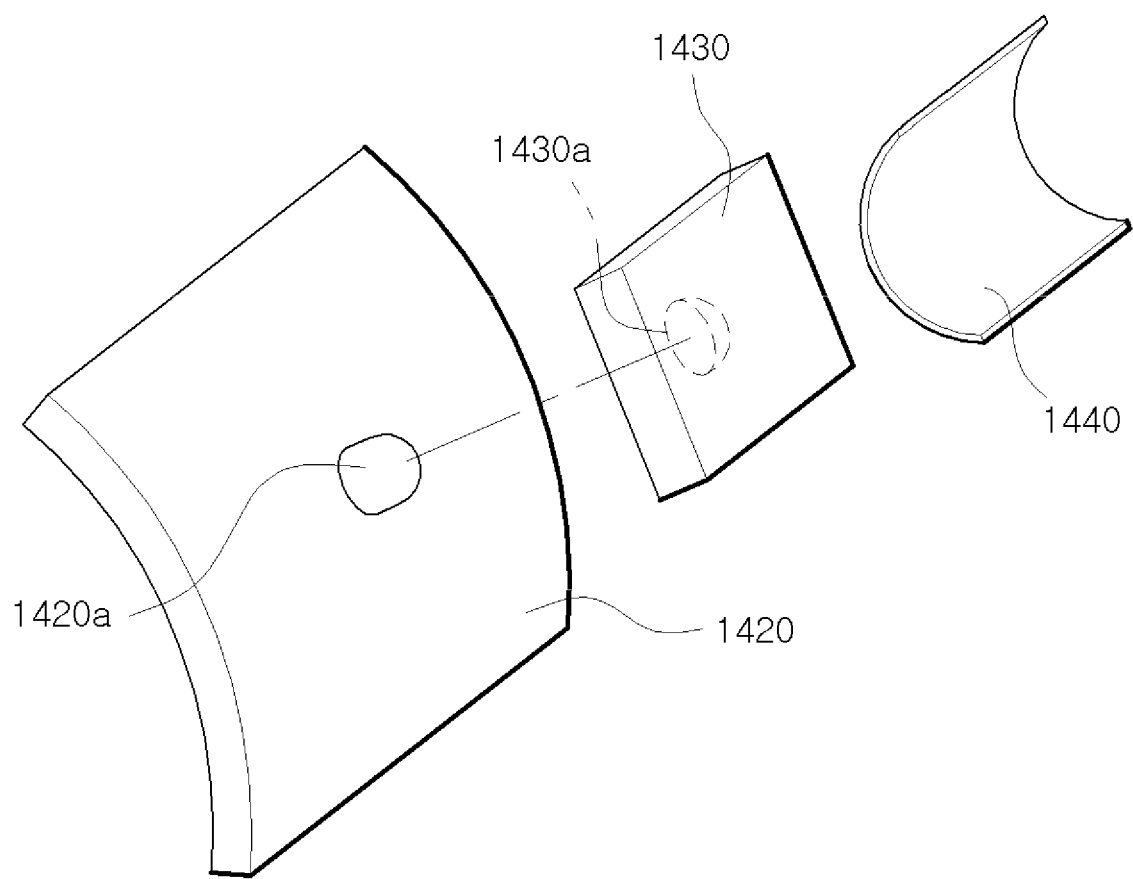

[FIG. 5]
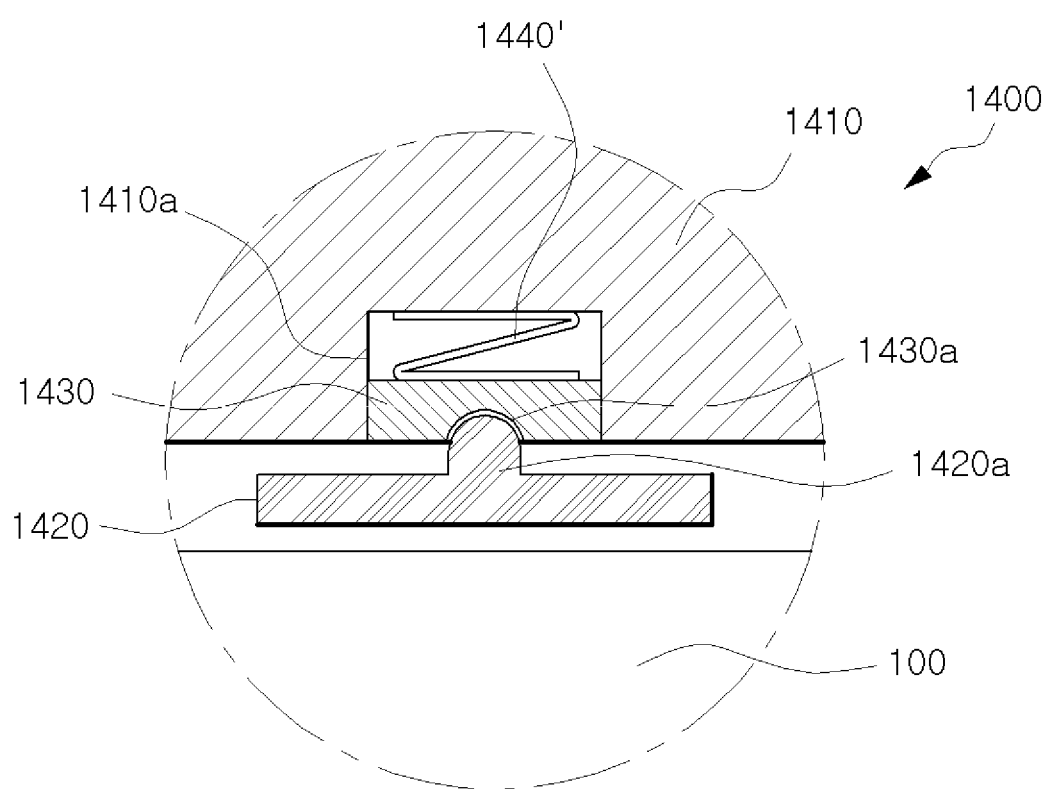

ROTARY SHAFT SUPPORT STRUCTURE AND TURBINE AND GAS TURBINE INCLUDING THE SAME

CROSS-REFERENCE TO RELATED APPLICATIONS

This application claims priority to Korean Patent Application No. 10-2017-0115165, filed on Sep. 8, 2017, the disclosure of which is incorporated herein by reference in its entirety.

BACKGROUND OF THE INVENTION

Field of the Invention

Exemplary embodiments of the present disclosure relate to a rotary shaft support structure and a turbine and gas turbine including the same, and more particularly, to a rotary shaft support structure that supports a circumferential surface of a rotary shaft passing through a gas turbine at each of a front end of a compressor casing and a rear end of a turbine casing, and a turbine and gas turbine including the same.

Description of the Related Art

Turbines are machines that obtain torque from impulse or reaction force using the flow of a compressible fluid such as steam or gas, and include a steam turbine using steam, a gas turbine using hot combustion gas, etc. Among them, the gas turbine largely includes a compressor, a combustor, and a turbine. The compressor has an air inlet for the introduction of air, and includes a plurality of compressor vanes and compressor blades alternately arranged in a compressor casing.

The combustor mixes fuel with air compressed by the compressor and burns the mixture using a burner to thereby produce high-temperature and high-pressure combustion gas. The turbine includes a plurality of turbine vanes and turbine blades alternately arranged in a turbine casing. In addition, a rotor is arranged to pass through the center of the compressor, combustor, turbine and exhaust chamber.

This gas turbine is advantageous in that it can consume a very small amount of lubricant, has a significantly reduced vibrating amplitude which is a characteristic of reciprocating machines, and can operate at a high speed because it does not have a reciprocating device such as a piston in a four-stroke engine and therefore has no friction portion between the piston and the cylinder causing deterioration.

Briefly, the gas turbine is operated in such a manner that the air compressed by the compressor is mixed with fuel for combustion to produce hot combustion gas and the produced combustion gas is injected into the turbine. The injected combustion gas generates torque while passing through the turbine vanes and the turbine blades, thereby allowing the rotor to rotate.

The technique related to the turbine of the gas turbine is disclosed in Korean Utility Model No. 20-0174662 entitled "Gas Turbine."

For the operation of such a gas turbine, a rotor as a rotary shaft is rotated and rotatably supported at both ends thereof. Tilting bearings are typically installed at the portions supporting the rotor.

Each of the tilting bearings consists of a pad supporting the rotor and a pivot housing supporting the pad. However, when a high load is applied to the tilting bearing for supporting the rotor, the tilting bearing may not perform as a bearing.

SUMMARY OF THE INVENTION

The present disclosure has been made in view of the above-mentioned problem, and an object thereof is to provide a rotary shaft support structure capable of supporting a circumferential surface of a rotary shaft passing through a gas turbine at each of a front end of a compressor casing and a rear end of a turbine casing and of exhibiting performance as a bearing by, when a high load is applied thereto, absorbing some of the load, and a turbine and gas turbine including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a rotary shaft support structure may include a main body arranged around a circumference of a rotary shaft passing through a center of a gas turbine and mounted to each of a compressor casing and a turbine casing of the gas turbine in order to support each of both ends of the rotary shaft; and a pad member disposed between the main body and the circumferential surface of the rotary shaft and biased against the circumferential surface of the rotary shaft for supporting the rotary shaft.

The rotary shaft support structure may further include a pivot protrusion protruding from the pad member toward the main body; and a pivot housing for receiving the pivot protrusion to rotatably support the pad member.

The pivot housing may be disposed between the pad member and an inner circumferential surface of the main body.

The inner circumferential surface of the main body may be provided with a mounting groove for receiving the pivot housing.

The rotary shaft support structure may further include a spring member seated in the mounting groove to bias the pivot housing against the pivot protrusion of the pad member.

The pivot housing may be housed inside the mounting groove and is biased toward the rotary shaft by the spring member.

The spring member may include a hemispheric leaf spring for contacting a supporting surface of the pivot housing.

In the above rotary shaft support structure, the pivot housing may be formed outside the pad member to rotatably support the pad member; and the spring member may be disposed between the pivot housing and the main body to support the pivot housing. The main body may have the mounting groove formed on its inner circumferential surface, the pivot housing being inserted into and mounted to the mounting groove, and the spring member may be formed between the bottom of the mounting groove and the pivot housing to elastically support the pivot housing. The pad member may have a rounded shape corresponding to the circumferential surface of the rotary shaft. The pad member may have the pivot protrusion protruding from its outer surface, the pivot protrusion being connected to the pivot housing, and the pivot housing may have the insertion groove into which the pivot protrusion is inserted. The pivot protrusion may include a hemispheric surface centrally disposed on the outer surface of the pad member and be inserted into the insertion groove, and the insertion groove may include a hemispheric surface for receiving the hemispheric surface of the pivot protrusion.

In accordance with another aspect of the present disclosure, a turbine may be configured to generate power by a passage of combustion gas supplied from a combustor and may include a rotary shaft passing through a center of a gas turbine; a turbine casing for accommodating a turbine rotor provided on a circumferential surface of the rotary shaft, the turbine rotor including a plurality of turbine blades coupled to a turbine disk rotated by the rotary shaft; and the above rotary shaft support structure. The turbine may further include a compressor casing for accommodating a compressor configured to suck and compress air, wherein the main body is further mounted to the compressor casing in order to support the rotary shaft.

In accordance with another aspect of the present disclosure, a gas turbine may include a compressor casing for accommodating a compressor configured to suck and compress air; a combustor configured to produce combustion gas by burning fuel mixed with the compressed air; and the above turbine.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a schematic cross-sectional view of a gas turbine including a rotary shaft support structure according to an embodiment of the present disclosure;

FIG. 2 is a detailed view of the rotary shaft support structure shown in FIG. 1;

FIG. 3 is a side view of the rotary shaft support structure of FIG. 1 supporting the rotary shaft;

FIG. 4 is an exploded perspective view of the rotary shaft support structure of FIG. 1; and FIG. 5 is a detailed view of the rotary shaft support structure shown in FIG. 1, according to another embodiment of the present disclosure.

DESCRIPTION OF SPECIFIC EMBODIMENTS

Reference will now be made in detail to exemplary embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a rotary shaft support structure and a turbine and gas turbine including the same according to exemplary embodiments of the present disclosure will be described with reference to the accompanying drawings.

Referring to FIG. 1, a gas turbine 10 according to the present disclosure includes a rotary shaft 100, a compressor 200, a torque tube 300, a combustor 400, and a turbine 1000. The rotary shaft 100 is a rod member that passes through the gas turbine 10 and has a tie rod while being installed across the center of the gas turbine 10. The rotary shaft 100 serves to fasten the compressor 200 and the turbine 1000.

The gas turbine 10 includes a housing 10a and a diffuser 10b disposed behind the housing 10a to discharge combustion gas having passed through the turbine 1000. The combustor 400 is disposed in front of the diffuser 10b to be supplied with compressed air for combustion.

In the flow direction of air, the compressor 200 is disposed upstream of the housing 10a and the turbine 1000 is disposed downstream of the housing 10a. The torque tube 300 as a torque transmission member is preferably disposed between the compressor 200 and the turbine 1000 to transmit a rotational torque generated by the turbine 1000 to the compressor 200.

The compressor 200 includes a plurality of compressor disks 220 (e.g., fourteen disks) fastened so as not to be axially separated from each other by the rotary shaft 100. The compressor disks 220 are preferably provided in a compressor casing 200a.

The compressor disks 220 are axially aligned in the state in which the rotary shaft 100 passes through the substantial centers of the compressor disks 220. The compressor disks 220 are arranged so as not to be rotatable relative to each other in such a manner that the opposing surfaces of the respective compressor disks 220 adjacent to each other are pressed by the rotary shaft 100.

Each of the compressor disks 220 has a plurality of compressor blades 240 radially coupled to the outer peripheral surface thereof, and each of the compressor blades 240 has a compressor blade root member 260 to be fastened to the compressor disk 220.

Compressor vanes 280 are disposed between each of the compressor disks 220 and an adjacent one thereof and are fixedly arranged in the housing 10a. The compressor vanes 280 are fixed so as not to rotate, unlike the compressor disk 220, and serve to align the flow of compressed air having passed through the compressor blades 240 of the compressor disk 220 to guide the air to the compressor blades 240 of a compressor disk 220 positioned downstream thereof.

The fastening method of the compressor blade root member 260 includes a tangential type and an axial type. These types may be selected according to the required structure of the commercial gas turbine, and may have a dovetail or fir-tree form. In some cases, the compressor blades may be fastened to the compressor disk using a fastener other than the above form, for example a fixture such as a key or a bolt.

A compressor rotor 210, which consists of the compressor disk 220 and the compressor blades 240, is preferably disposed in a multi-stage manner in the housing 10a.

The rotary shaft 100 is disposed to pass through the centers of the plurality of compressor disks 220. One end of the rotary shaft 100 is fastened to a compressor disk 220 positioned at the most upstream side, and the other end thereof is fixed into the torque tube 300.

The combustor 400 mixes the compressed air introduced thereinto with fuel for combustion to produce high-temperature and high-pressure combustion gas with high energy, and increases the temperature of the combustion gas to a temperature at which the combustor and turbine components are able to be resistant to heat in a constant-pressure combustion process.

The constituent combustor of the combustion system of the gas turbine may consist of a plurality of combustors arranged in a cell form in a casing, and includes a burner that has a fuel injection nozzle or the like, a combustor liner that forms a combustion chamber, and a transition piece that is a connection between the combustor and the turbine.

In detail, the liner defines a combustion space in which the fuel injected from the fuel nozzle is mixed with the compressed air from the compressor for combustion. The liner may include a flame container that defines the combustion space, and a flow sleeve that defines an annular space while surrounding the flame container. The fuel nozzle is coupled to the front end of the liner, and an ignition plug is coupled to the side wall of the liner.

The transition piece is connected to the rear end of the liner to send the combustion gas burned by the ignition plug to the turbine. The transition piece is configured such that the outer wall thereof is cooled by the compressed air supplied from the compressor so as to prevent damage of the transition piece due to the high temperature of the combustion gas.

To this end, the transition piece has cooling holes formed for injection of air thereinto, and the compressed air is introduced through the holes into the transition piece to cool a main body therein and then flows to the liner.

The cooling air used to cool the transition piece may flow in the annular space of the liner, and may impinge on compressed air as cooling air supplied through cooling hole formed in the flow sleeve from the outside of the flow sleeve in the outer wall of the liner.

The high-temperature and high-pressure combustion gas discharged from the combustor 400 is supplied to the turbine 1000. The supplied high-temperature and high-pressure combustion gas gives impingement or reaction force to the rotor blades of the turbine while expanding to generate a rotational torque. The obtained rotational torque is transmitted via the torque tube 300 to the compressor 200, and power exceeding the power required to drive the compressor is used to drive a generator or the like.

The turbine 1000 basically has a structure similar to that of the compressor 200, and includes a plurality of turbine rotors 1100, each of which consists of a turbine disk 1120 and a plurality of turbine blades 1140.

The plurality of turbine blades 1140 are coupled to the outer surface of each of a plurality of turbine disks 1120, and the plurality of turbine disks 1120 are radially arranged on the outer peripheral surface of the tie rod 100 to be rotated by the combustion gas supplied from the combustor 400.

The turbine blades 1140 are coupled to the turbine disk 1120 in a dovetail manner or the like. A plurality of turbine vanes 1300 fixed into a turbine casing 1200 are arranged in a multi-stage manner between the turbine blades 1140 arranged on the outer peripheral surface of the rotary shaft 100, and serve to guide the flow of combustion gas having passed through the turbine blades 1140.

The plurality of turbine vanes 1300 are arranged in a plurality of rows in the circumferential direction of the turbine casing 1200, and are preferably formed to be sequentially alternated with the turbine blades 1140 in the axial direction of the tie rod 100.

The turbine disk 1120 is a rotor that rotates along with the rotation of the turbine blades 1140 by combustion gas, and the turbine vanes 1300 are fixed to the turbine casing 1200 and are stators fixed irrespective of the rotation of the turbine blades 1140. The combustion gas pushes the turbine blades 1140 while passing through the turbine blades 1140. When the combustion gas pushes the turbine blades 1140, the turbine blades 1140 and the turbine disk 1120 rotate about the tie rod 100, and the flow of the combustion gas having passed through the turbine blades 1140 is guided by the turbine vanes 1300 so that the combustion gas is discharged to the outside through the diffuser 10*b*.

Referring to FIGS. 1 to 4, rotary shaft support structures 1400 are provided at the front end of the housing 10*a* and the rear end of the turbine casing 1200 to support the circumferential surface of the rotary shaft 100.

Each of the rotary shaft support structures 1400 includes a main body 1410 that is mounted to each of the housing 10*a* and the turbine casing 1200 and is provided adjacent to the circumferential surface of the rotary shaft 100, a pad member 1420 that supports the circumferential surface of the rotary shaft 100, a pivot housing 1430 formed outside the pad member 1420 to rotatably support the pad member 1420, and a spring member 1440 that supports the pivot housing 1430. In order to support the circumferential surface of the rotary shaft 100, the pad member 1420 is disposed between the rotary shaft circumferential surface and the main body 1410 and is mechanically biased against the rotary shaft circumferential surface with respect to an inner circumferential surface of the main body 1410. Thus, the pivot housing 1430 is disposed between the pad member 1420 and an inner circumferential surface of the main body 1410.

As shown in FIG. 3, the main body 1410 is arranged around the circumference of the rotary shaft 100, which passes through the center of the gas turbine 1000, such that the rotary shaft circumferential surface is opposed by the inner circumferential surface of the main body 1410, which is collectively disposed all around the rotary shaft 100. The main body 1410 is mounted to each of the compressor casing 200*a* and the turbine casing 1200 of the gas turbine 100 in order to support each of both ends of the rotary shaft 100.

Preferably, the pivot housing 1430 is mounted to the inner circumferential surface of the main body 1410, and the main body 1410 has a mounting groove 1410*a* formed in the inner circumferential surface for insertion and mounting of the pivot housing 1430. Thus, the inner circumferential surface of the main body 1410 is provided with the mounting groove 1410*a* for receiving the pivot housing 1430, which is housed inside the mounting groove 1410*a* and is biased toward the rotary shaft 100 by the spring member 1440. That is, with the pivot housing 1430 inserted in the mounting groove 1410*a*, the spring member 1440 is seated in the mounting groove 1410*a* to bias the pivot housing 1430 against a pivot protrusion (described later) of the pad member 1420. Here, the spring member 1440 may be a hemispheric leaf spring for contacting a supporting surface of the pivot housing 1430, its supporting surface being on the opposite side from an insertion groove (described later).

The pad member 1420 is rotatably supported by the pivot housing 1430, and supports the circumferential surface of the rotary shaft 100. Preferably, the pad member 1420 has a rounded shape corresponding to the circumferential surface of the rotary shaft 100. The pad member 1420 has a pivot protrusion 1420*a* protruding from the outer surface thereof for connection to the pivot housing 1430, and the pivot protrusion 1420*a* has a hemispheric shape and is formed at the center on the outer surface of the pad member 1420. Accordingly, the pivot protrusion 1420*a* protrudes from the pad member 1420 toward the main body 1410, and the pivot housing 1430 receives the pivot protrusion 1420*a* in order to rotatably support the pad member 1420.

Preferably, the pivot housing 1430 has an insertion groove 1430*a* into which the pivot protrusion 1420*a* is inserted, and the insertion groove 1430a has a hemispheric shape corresponding to the pivot protrusion 1420a.

The spring member 1440 is provided between the inner peripheral surface of the main body 1410 and the pivot housing 1430 to support the pivot housing 1430 at the lower portion thereof. Preferably, the spring member 1440 is a hemispheric leaf spring, and supports the pivot housing 1430 at the lower portion of the bent portion thereof.

FIG. 5 shows a rotary shaft support structure supporting a rotary shaft, according to another embodiment of the present disclosure.

Referring FIG. 5, a spring member 1440' may have a multiple bent shape instead of the hemispheric shape of the spring member in the previous embodiment, and it may also be modified to have a typical ring shape instead of the hemispheric shape or the multiple bent shape.

Since the rotary shaft support structure 1400 supports the circumferential surface of the rotary shaft 100 passing through the gas turbine, it can have performance as a bearing by, when a high load is applied thereto, absorbing some of the load.

As is apparent from the above description, the exemplary embodiments of the present disclosure can provide the rotary shaft support structure having an improved structure, which supports the circumferential surface of the rotary shaft passing through the gas turbine at each of the front end of the compressor casing and the rear end of the turbine casing, and exhibiting performance as a bearing by absorbing a portion of an applied load, and the turbine and gas turbine including the same.

While the present disclosure has been described with respect to the embodiments illustrated in the drawings, this is merely for illustrative purposes. It will be understood by those skilled in the art that various modifications and other equivalent embodiments may be made without departing from the spirit and scope of the disclosure as defined in the following claims. Therefore, the true technical protection scope of the present disclosure should be defined by technical concepts of the appended claims.

What is claimed is:

1. A rotary shaft support structure comprising:
   first and second supports respectively mounted to each of a compressor casing and a turbine casing of a gas turbine to support opposite ends of a rotary shaft passing through a center of the gas turbine, each of the first and second supports being arranged around a circumferential surface of the rotary shaft and including:
   a main body having an inner circumferential surface in which a mounting groove is formed;
   a pad member for supporting the rotary shaft, the pad member disposed between the main body and the rotary shaft and biased against the circumferential surface of the rotary shaft;
   a pivot protrusion protruding from the pad member toward the main body;
   a pivot housing inserted into the mounting groove and configured to receive the pivot protrusion and to rotatably support the pad member; and
   a hemispheric leaf spring that is disposed between the pivot housing and a bottom surface of the mounting groove and includes a convex side disposed toward the pivot housing, the hemispheric leaf spring configured to elastically support the pivot housing by contacting a supporting surface of the pivot housing.

2. The rotary shaft support structure according to claim 1, wherein the hemispheric leaf spring is further configured to contact the supporting surface of the pivot housing at a central point of the supporting surface, the central point of the supporting surface being in radial alignment with the pivot protrusion.

3. The rotary shaft support structure according to claim 1, wherein the pivot housing is disposed between the pad member and the inner circumferential surface of the main body.

4. The rotary shaft support structure according to claim 1, wherein the mounting groove has a radial depth greater than a radial height of the pivot housing and is configured to slidably receive parallel sides of the pivot housing according to an operation of the hemispheric leaf spring.

5. The rotary shaft support structure according to claim 1, wherein the hemispheric leaf spring is seated in the mounting groove and configured to bias the pivot housing against the pivot protrusion of the pad member.

6. The rotary shaft support structure according to claim 1, wherein the pivot housing is housed inside the mounting groove and is biased toward the rotary shaft by the hemispheric leaf spring.

7. The rotary shaft support structure according to claim 1, wherein the pad member has a rounded shape corresponding to the circumferential surface of the rotary shaft.

8. The rotary shaft support structure according to claim 7, wherein:
   the pad member has a pivot protrusion protruding from its outer surface, the pivot protrusion being connected to the pivot housing; and
   the pivot housing has an insertion groove into which the pivot protrusion is inserted.

9. The rotary shaft support structure according to claim 8, wherein:
   the pivot protrusion includes a hemispheric surface centrally disposed on the outer surface of the pad member and is inserted into the insertion groove; and
   the insertion groove includes a hemispheric surface for receiving the hemispheric surface of the pivot protrusion.

10. A turbine configured to generate power by a passage of combustion gas supplied from a combustor, the turbine comprising:
    a rotary shaft passing through a center of a gas turbine;
    a turbine casing for accommodating a turbine rotor provided on a circumferential surface of the rotary shaft, the turbine rotor including a plurality of turbine blades coupled to a turbine disk rotated by the rotary shaft; and
    a rotary shaft support structure comprising:
    a first support mounted to the turbine casing to support one end of the rotary shaft and arranged around a circumferential surface of the rotary shaft, the first support including a first configuration of each of:
    a main body having an inner circumferential surface in which a mounting groove is formed;
    a pad member for supporting the rotary shaft, the pad member disposed between the main body and the rotary shaft and biased against the circumferential surface of the rotary shaft;
    a pivot protrusion protruding from the pad member toward the main body;
    a pivot housing inserted into the mounting groove and configured to receive the pivot protrusion and to rotatably support the pad member; and
    a hemispheric leaf spring that is disposed between the pivot housing and a bottom surface of the mounting groove and includes a convex side disposed toward the pivot housing, the hemispheric leaf spring configured to elastically support the pivot housing by contacting a supporting surface of the pivot housing.

11. The turbine according to claim 10, further comprising:
a compressor casing for accommodating a compressor configured to suck and compress air; and
a second support mounted to the compressor casing to support another end of the rotary shaft and arranged around the circumferential surface of the rotary shaft, the second support including a second configuration of each of the main body, the pad member, the pivot protrusion, the pivot housing, and the hemispheric leaf spring.

12. A gas turbine comprising:
a compressor casing for accommodating a compressor configured to suck and compress air;
a combustor configured to produce combustion gas by burning fuel mixed with the compressed air; and
a turbine configured to be supplied with the combustion gas, comprising:
  a rotary shaft passing through a center of the gas turbine;
  a turbine casing for accommodating a turbine rotor provided on a circumferential surface of the rotary shaft, the turbine rotor including a plurality of turbine blades coupled to a turbine disk rotated by the rotary shaft; and
  a rotary shaft support structure comprising:
    first and second supports respectively mounted to each of a compressor casing and a turbine casing of a gas turbine to support opposite ends of a rotary shaft passing through a center of the gas turbine, each of the first and second supports being arranged around a circumferential surface of the rotary shaft and including:
      a main body having an inner circumferential surface in which a mounting groove is formed;
      a pad member for supporting the rotary shaft, the pad member disposed between the main body and the rotary shaft and biased against the circumferential surface of the rotary shaft;
      a pivot protrusion protruding from the pad member toward the main body;
      a pivot housing inserted into the mounting groove and configured to receive the pivot protrusion and to rotatably support the pad member; and
      a hemispheric leaf spring that is disposed between the pivot housing and a bottom surface of the mounting groove and includes a convex side disposed toward the pivot housing, the hemispheric leaf spring configured to elastically support the pivot housing by contacting a supporting surface of the pivot housing.

* * * * *